(12) United States Patent
McConnell et al.

(10) Patent No.: US 10,757,486 B2
(45) Date of Patent: Aug. 25, 2020

(54) INTELLIGENT AND DYNAMIC PROCESSING OF SENSOR READING FIDELITY

(71) Applicant: SAP SE, Walldorf (DE)

(72) Inventors: Tim McConnell, Kitchener (CA); Lalit Canaran, Toronto (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/193,075

(22) Filed: Nov. 16, 2018

(65) Prior Publication Data

US 2020/0162801 A1 May 21, 2020

(51) Int. Cl.
*H04Q 9/00* (2006.01)
*H04L 29/08* (2006.01)

(52) U.S. Cl.
CPC .............. *H04Q 9/00* (2013.01); *H04L 67/12* (2013.01); *H04Q 2209/82* (2013.01)

(58) Field of Classification Search
CPC ....... H04Q 9/00; H04Q 2209/82; H04L 67/12
See application file for complete search history.

(56) References Cited

U.S. PATENT DOCUMENTS

| | | | | |
|---|---|---|---|---|
| 2013/0236171 A1* | 9/2013 | Saunders | ............... | H04B 10/70 398/26 |
| 2013/0317659 A1* | 11/2013 | Thomas | ............ | H04W 52/0216 700/286 |
| 2019/0336825 A1* | 11/2019 | Douglas | ............. | A63B 71/0622 |

\* cited by examiner

*Primary Examiner* — Amine Benlagsir
(74) *Attorney, Agent, or Firm* — Buckley, Maschoff & Talwalkar LLC

(57) ABSTRACT

A method includes receiving a sensor data stream from a sensor, determining that the sensor data stream is associated with a sensor fidelity rule specifying a triggering event, a fidelity modification, and a modification period, sampling the sensor data stream according to a first sampling interval, responsive to occurrence of a triggering event, changing the first sampling interval to a second sampling interval based on the fidelity modification, wherein the second sampling interval is different from the first sampling interval, determining whether the modification period has elapsed and whether the triggering event is active, and sampling the sensor data stream according to the second sampling interval when it is determined that the modification period has not elapsed and the triggering event is active.

20 Claims, 5 Drawing Sheets

400

| | | |
|---|---|---|
| | *Temp SF* | |

General Information

Sensor Profile ID: 32c6f4b4-a799-11e8-8000-931e2166cb39
Sensor Profile Name: Temperature
Rule ID: 32C6f4b4-a799-11e8-8000-931e2166cb39
*Rule Name: Temp SF
Rule Description: This controls the fidelity of temperature sensors
Rule Context Data:
Rule Chainability: ☐

Rule Definition

*Rule Type: Sensor Fidelity
*Scope Level: Sensor Profile | 32c6f4b4-a799-11e8-8000-931e2166cb39
*Max Event Frequency: ☑ 90 | ms sec min hr
*Enterprise Output Frequency: ☑ 3 | ms sec min hr

Event Destination

*Rule Type: IoTServicesPlugin
Edge Event Storage: ☑
*Edge Keep Interval (days): 7
*Max Edge Readings to Store: 1000

Save   Cancel

INTELLIGENT AND DYNAMIC PROCESSING OF SENSOR READING FIDELITY

BACKGROUND

Often raw Internet of Things (IoT) data streams are sent at high volumes (e.g., in their entirety) to the cloud for processing. This data is often received at high frequency rates (e.g., in milliseconds or higher). However, it is impractical to send all the data to cloud storage due to, for example, bandwidth capacity limits and intermittent connectivity. Such an approach does not scale and is cost prohibitive even if bandwidth exists. Moreover, decisions based on sensor data must often be made in real-time, such that data is processed instantly and securely at the edge of the network, without a roundtrip to the cloud.

Therefore, more intelligence is needed at the edge to manage the rate at which IoT sensor data is sent to the cloud.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 4 is an outward view of a user interface according to some embodiments.

Figure 1:
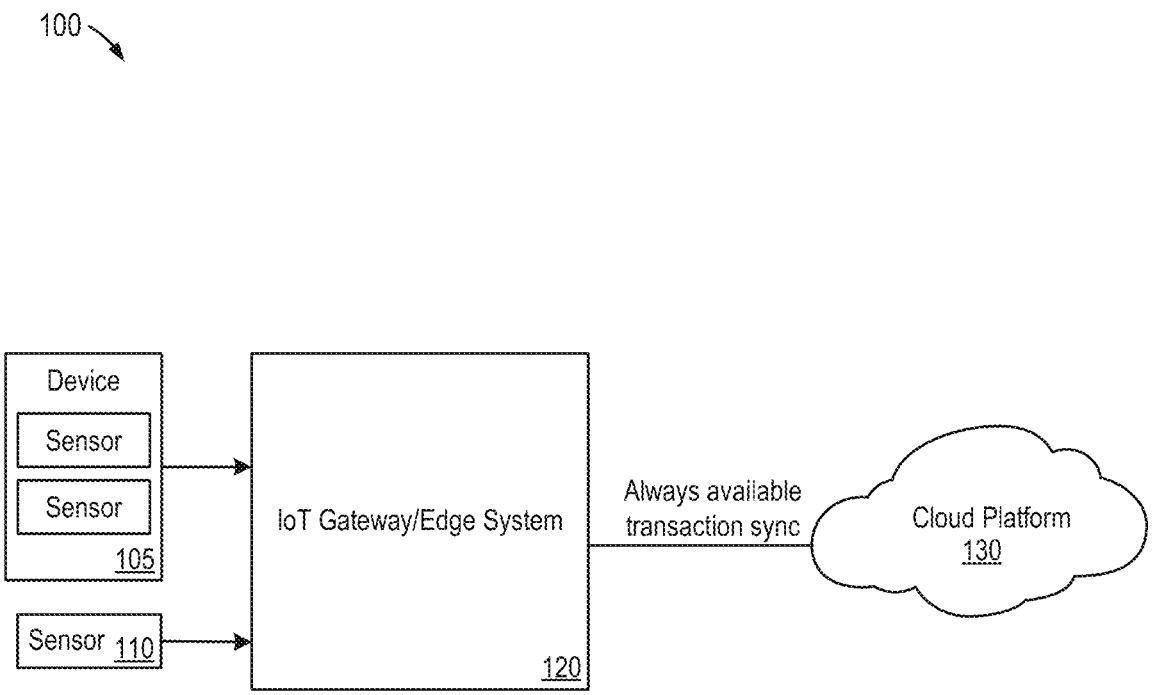
FIG. 1 is a block diagram of an overall system architecture according to some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The disclosed embodiments generally relate to the field of edge computing, and more specifically to edge analytics for handling large amounts of data generated by IoT devices.

Devices and sensors can produce more data than is economically feasible to transmit to the cloud. To address this problem, analytical algorithms can be applied at the edge to process the incoming sensor data and send only higher level events/alerts (e.g., when some warning or error condition is occurring) to the cloud. For example, a fidelity modification technique and system is desired to handle the large amounts of data generated by IoT machines, such that, for example, the fidelity (e.g., sampling interval) of raw sensor data streams is reactive (e.g., tied to sensor conditions or business rules).

As disclosed herein, a sampling interval/rate of a data stream (also referred to as "fidelity" or "fidelity frequency") may be automatically and dynamically adjusted based on events occurring in a system.

The environments described herein are merely exemplary, and it is contemplated that the techniques described may be extended to other implementation contexts.

One or more embodiments that include one or more of the advantages discussed are described in detail below with reference to the figures.

FIG. 1 is a block diagram of an overall system architecture 100 according to some embodiments. Architecture 100 includes sensor(s) (e.g., multiple sensors of a device 105 or a single sensor 110), IoT gateway/edge system 120, and cloud platform 130. IoT gateway 120 provides data persistence and processing capabilities at the edge.

IoT edge computing describes the capability of processing, storing, and analyzing sensor data as well as decision making at IoT gateways. Edge computing moves processing and data storage away from the cloud or enterprise data center out to the devices on the edge of the network close to the source of the data.

Each of the illustrated components may be implemented by software and/or one or more hardware elements, with some software and/or hardware elements being shared among more than one illustrated component.

Some of the elements of architecture 100 resemble the structure and functionality of software modules developed by SAP AG. However, structures with similar functionalities could be found in software products developed by other vendors, as well. Alternative embodiments may utilize other kinds of computer system architectures.

FIG. 1 represents a logical architecture for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

Figure 2:
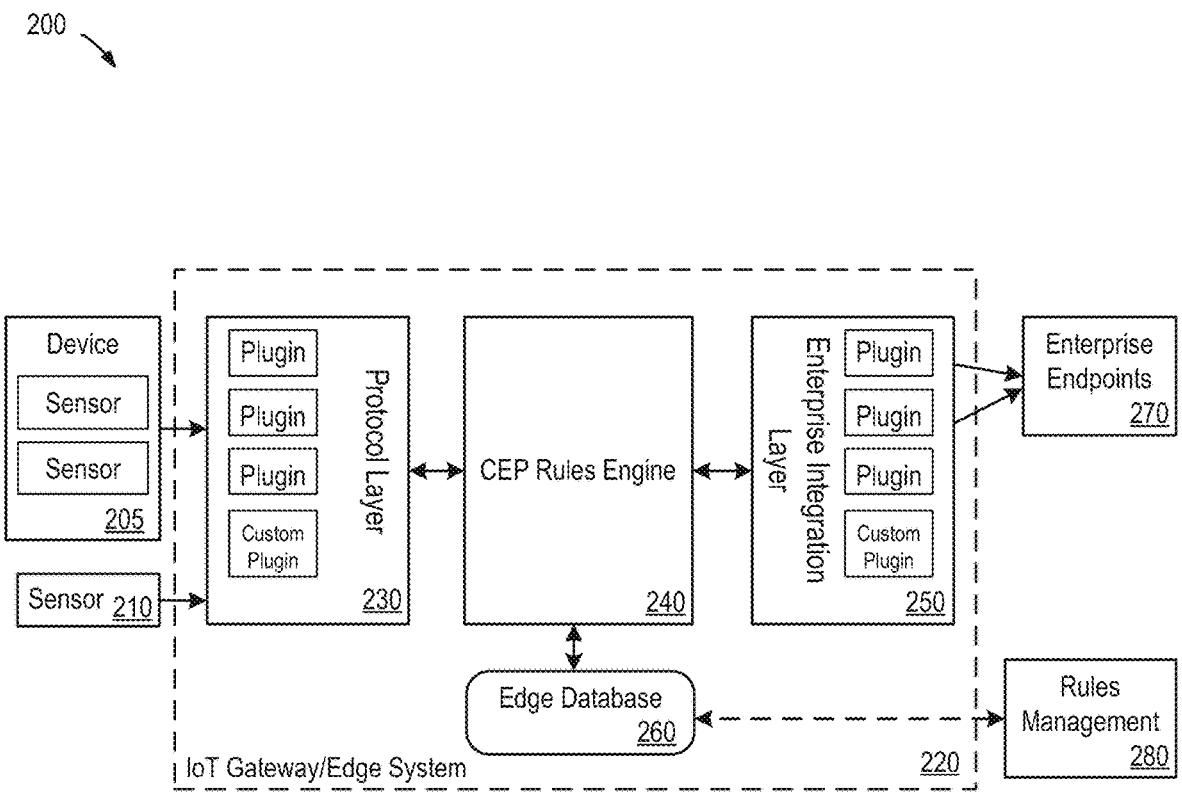
FIG. 2 is a more detailed block diagram of the system of FIG. 1 in which illustrative subcomponents of the system and their relationships to each other are shown.

FIG. 2 is a more detailed block diagram of the system of FIG. 1 in which illustrative subcomponents of the system and their relationships to each other are shown. Architecture 200 includes sensor(s) (e.g., multiple sensors of a device 205 or a single sensor 210), IoT gateway/edge system 220, local edge database 260, enterprise endpoints 270, and rules management module 280. IoT gateway 220 includes a protocol layer 230, complex event processing (CEP) rules engine 240, and enterprise integration layer 250.

Protocol layer 230 may be configured to recognize any useful protocol, including custom protocols. In the CEP rules engine 240, events are processed by means of rules including event patterns, actions, and constraints. An event pattern is a template that matches certain sets of events. In one embodiment, the template or event pattern describes not only the events but also their causal dependencies, timing, data parameters, and context. An event pattern rule is a reactive rule that specifies an action to be taken whenever an event pattern is matched. An event pattern may be matched with real-time as well as non real-time event data. A reactive rule has two parts: a trigger, which is an event pattern, and an action, which is an event that is created whenever the trigger matches. A constraint expresses a condition that must be satisfied by the events observed in a system. Constraints can be used to specify not only how a target system should behave, but also how its users should use it. When a pattern is detected, the rule is triggered, and the user (human or automated) can take actions in response. The enterprise integration layer 250 is responsible for integrating the IoT environment into an enterprise's business processes.

Sensor fidelity rules control the frequency at which readings from the sensor are outputted to edge database/storage 260 (e.g., persistence service) or to any number of enterprise endpoints 270 (e.g., RESTful (representational state transfer) endpoints, WebSockets, MQTT (Message Queueing Telemetry Transport) endpoints, MQTT brokers, etc.)

For example, data may be automatically persisted in edge database 260 (e.g., edge storage of IoT services data). There may be several configuration settings for the length of time these objects are stored. The persistence service provides both Java and REST APIs to retrieve this data from the database.

Database 260 may comprise any query-responsive data source or sources that are or become known, including but not limited to a structured-query language (SQL) relational database management system. Database 260 may comprise a relational database, a multi-dimensional database, an eXtendable Markup Language (XML) document, or any other data storage system storing structured and/or unstructured data. The data of database 260 may be distributed among several relational databases, dimensional databases, and/or other data sources. Embodiments are not limited to any number or types of data sources.

In some embodiments, the data of database 260 may comprise one or more of conventional tabular data, row-based data, column-based data, and object-based data. Moreover, the data may be indexed and/or selectively replicated in an index to allow fast searching and retrieval thereof. Database 260 may support multi-tenancy to separately support multiple unrelated clients by providing multiple logical database systems which are programmatically isolated from one another.

Database 260 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

In one embodiment, rules management module 280 represents a cloud-based application which can be used to define fidelity rules and/or other streaming rules that are then deployed to the edge in which they drive CEP rules engine 240. In this way, the fidelity rules may be changed on-the-fly.

Figure 3:
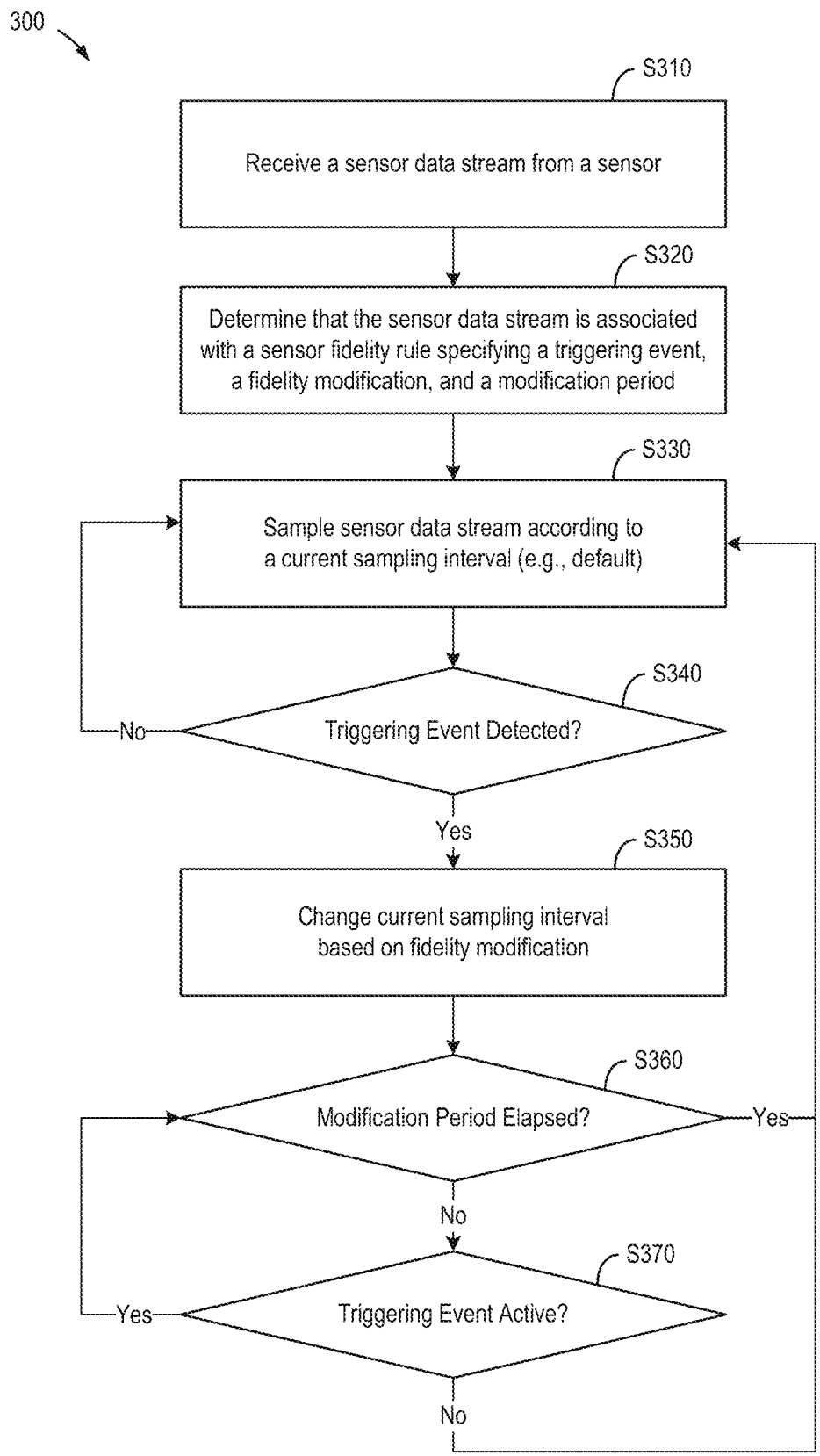
FIG. 3 is a flow diagram illustrating an exemplary process according to some embodiments.

FIG. 3 is a flow diagram illustrating an exemplary process 300 according to some embodiments. Initially, at S310, a sensor data stream is received from a sensor. The process continues, at S320, when it is determined that the received sensor data stream is associated with a sensor fidelity rule. If the received sensor data stream is not associated with a sensor fidelity rule, then the remaining process steps are skipped. Typically, sensor fidelity rules are configured to generate actionable events based on raw sensor data and/or control the flow (e.g., sensor fidelity) of raw sensor data (e.g., for big data analysis).

In an embodiment, a sensor fidelity rule specifies a triggering event, a fidelity modification, and a modification period. Additionally or alternatively, a rule may specify other parameters or other combinations of parameters.

At S330, the sensor data stream is sampled according to a current/initial sampling interval (e.g., a first default sampling interval). At S340, a determination is made as to whether a triggering event is detected.

If a triggering event is detected at S340, then the current sampling interval is changed based on the fidelity modification specified by the associated sensor fidelity rule. If a triggering event is not detected at S340, then the sensor data stream continues to be sampled according to the current sampling interval until a triggering event is detected.

Next, at S350, responsive to the occurrence of a triggering event, the current (e.g., first) sampling interval is changed (e.g., to a second sampling interval) based on the fidelity modification specified by the associated sensor fidelity rule. Typically, the second sampling interval is different from the first sampling interval.

In some embodiments, the sensor fidelity rule may be dynamically or statically defined. For example, changes to the sampling interval (e.g., sensor fidelity frequency) may be based on the occurrence of user-defined events (e.g., business conditions). In other embodiments, the sensor fidelity rule may be changed based on information obtained from an external data source. In yet other embodiments, other rules may be configured to change the sampling interval when triggered (e.g., a related or unrelated sensor with an average reading over a threshold value causing the sampling interval to be changed). That is, the sampling interval may be changed based on local insight generated by the outcomes of existing sensor fidelity rules (e.g., for an explicit period of time or until a trigger condition is no longer active). These other rules can themselves be configured dynamically through external data sources.

In some embodiments, an external data source may include, but is not limited to, an enterprise computing system including applications and data. For example, a triggering value used in the rules that affects fidelity (e.g., average temperature goes "above 90° C." or pH sensor goes "below four"), may be obtained from the enterprise computing system. This knowledge within the enterprise system may in turn be used at the edge to modify fidelity (e.g., the sampling interval). In this way, information from an external data source can be used to modify rules or affect the decision points of process 300.

The process proceeds to S360, where it is determined whether the modification period (e.g., specified by the associated sensor fidelity rule) has elapsed, and at S370, whether the triggering event is active.

In a case where the modification period has not elapsed and the triggering event is still active, the sensor data stream continues to be sampled according to the second sampling interval. In a case where the modification period has elapsed or the triggering event is no longer active, the system reverts back to sampling the sensor data stream according to the first (e.g., default) sampling interval. The modification period may specify a temporary or indefinite change to the sampling interval (e.g., fidelity).

For purposes of illustration, a sensor fidelity rule may specify that when the average temperature goes above 90° C. (e.g., triggering event), increase the enterprise sensor fidelity frequency to every five seconds (e.g., fidelity modification) for the next hour (e.g., modification period).

For purposes of illustration, a sensor fidelity rule may specify that when the pH sensor goes below four (e.g., triggering event), increase the alkalinity edge sensor fidelity frequency to every one minute (e.g., fidelity modification), indefinitely (e.g., modification period).

In some embodiments, each stream (e.g., sensor data stream) may be associated with more than one (e.g., a plurality) of fidelity rules. In such a case, one or more processes 300 may run in parallel for each rule. Also, in some embodiments, a fidelity rule may apply to more than one stream.

FIG. 4 is an outward view of a user interface (UI) screen according to some embodiments. More specifically, FIG. 4 is a UI screen 400 illustrating configuration tool capabilities according to some embodiments. For example, UI screen 400 allows configuration of fidelity rules (e.g., temperature sensor fidelity ("Temp SF")) which control the flow of raw sensor data being sent to the edge 260 and enterprise 270 destinations.

A rule is user-defined logic applied to the sensor readings of a specified sensor profile. When a rule is satisfied, it triggers an event or controls the fidelity of IoT sensor data. Several built-in, configurable rule types are supported natively along with the option to build custom rules.

To create a rule, the logic used to determine that a certain event has occurred is first defined. A user may configure where these events are sent by specifying destinations within the rule. Destinations include the edge database and any number of available enterprise plugins. This allows the user to notify services that the event has occurred. In addition, a user can set one or more actions to be performed every time the event occurs.

A user may create rules within sensor profiles, which can be applied to a variety of scopes. They are also uniquely defined for the sensor profile they belong to. Rules can also be enabled or disabled by the administrator.

In one embodiment, a rule contains the following sections: general information section (e.g., rule name, rule description, rule context data, and rule chainability), and a rule definition section (e.g., rule-specific attributes to define rule logic, such as a max event frequency, which controls how frequently an event occurs). Events trigger every time an associated sensor reading fulfills the requirements of the rule. Consider a temperature sensor that has risen to 90 degrees Celsius and remains that way. A value monitoring rule that triggers an event when the average sensor reading is over 80 degrees Celsius will fire constantly while the reading remains at 90 degrees. The max event frequency controls how frequently an event occurs. For an event to be triggered hourly, for example, a user would set the minimum time between events to 1 hour.

In some embodiments, rule-specific attributes may include an edge output frequency and an enterprise output frequency. An edge output frequency is the frequency at which sensor readings should be outputted to the edge storage location. A REST API may be used to access the edge data. An enterprise output frequency is the frequency at which sensor readings should be outputted to the enterprise location.

Scoping allows rules to only apply to readings from a sensor with specific properties, controlling how often a rule is applied. A scope level is a set of predefined attributes that can apply to the device or the sensor.

Additionally, a rule may contain event actions (e.g., automated, user-configured responses to events generated by rules) and event destination/sensor readings destination (e.g., edge events storage, specifying whether events are stored locally in edge storage, and an edge keep interval, specifying the length of time to store events in edge storage).

There is an option to change the sensor fidelity when specific events occur. A sensor fidelity rule (e.g., specify at least a triggering event, a fidelity modification, and a modification period) changes the edge and enterprise output frequencies for a sensor profile. This is only applicable to sensor profiles with an enabled sensor fidelity rule.

Action-specific attributes include a target sensor profile, an edge fidelity change, and an enterprise fidelity change. In some embodiments, sensor fidelity changes are optionally reverted/rolled back to original frequencies after a configurable period of time. A target sensor profile pulls the sensor profiles that have a sensor fidelity rule enabled. An edge fidelity change specifies the new frequency or frequencies and the rollback time period(s) (if desired) for the edge storage destination. An enterprise fidelity change specifies the new frequency or frequencies and the rollback time period(s) (if desired) for the enterprise destination. That is, a sensor data stream may be sampled at different sampling intervals by different receiving IoT endpoints.

Edge sensor data can be pulled to the enterprise for analysis upon request. For example, pressure gauge readings may be streamed every 500 ms. The edge may receive a reading every few seconds, while the enterprise backend may receive a reading hourly. Higher fidelity data can be pulled from the edge if there is a problem. Generally, one sensor fidelity rule is enabled on a sensor at any point in time.

Multiple sensor fidelity change actions can be applied to the same sensor profile. This allows the user to configure a sensor fidelity increase on a certain event and configure a sensor fidelity decrease on a separate event. For example, assume the enterprise sensor fidelity frequency is configured to 60 seconds. When the average temperature goes above 90° C., increase the enterprise sensor fidelity frequency to every 5 seconds for the next hour (rollback in effect). When the average temperature goes below 90° C., decrease the enterprise sensor fidelity frequency to every 60 seconds (rollback not in effect).

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

Figure 5:
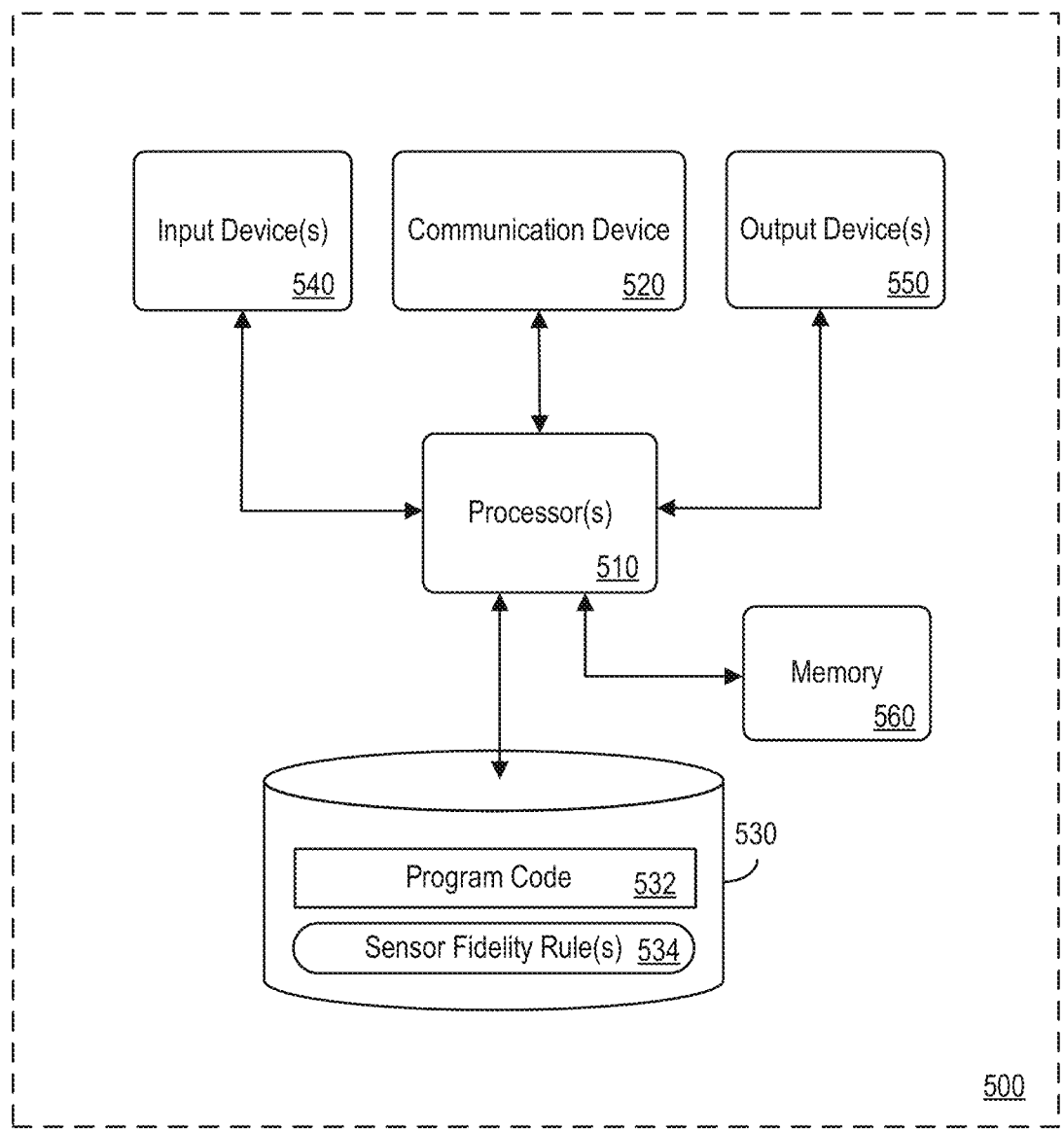
FIG. 5 is a block diagram of an apparatus according to some embodiments.

FIG. 5 is a block diagram of apparatus 500 according to some embodiments.

Apparatus 500 may comprise a general- or special-purpose computing apparatus and may execute program code to perform any of the functions described herein. Apparatus 500 may comprise an implementation of one or more elements of system 100 or 200. Apparatus 500 may include other unshown elements according to some embodiments.

Apparatus 500 includes processor(s) 510 operatively coupled to communication device 520, data storage device 530, one or more input devices 510, one or more output devices 550, and memory 560. Communication device 520 may facilitate communication with external devices. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to manipulate graphical user interfaces and to input information into apparatus 500. Output device(s) 550 may comprise, for example, a display (e.g., a display screen), a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM).

Program code 532 of data storage device 530 may be executable by processor 510 to provide functions described herein, including but not limited to process 300. Embodiments are not limited to execution of these functions by a single apparatus. Data storage device 530 may also store sensor fidelity rules 534 (e.g., in the form of a table or any other data structure). Data storage device 530 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computer-implemented method comprising:
receiving a sensor data stream from a sensor;
determining that the sensor data stream is associated with a sensor fidelity rule specifying a triggering event, a fidelity modification, and a modification period, wherein the triggering event is a change in a value that is monitored by the sensor;
sampling the sensor data stream according to a first sampling interval;
responsive to occurrence of the triggering event, changing the first sampling interval to a second sampling interval based on the fidelity modification, wherein the second sampling interval is different from the first sampling interval;
determining whether the modification period has elapsed and whether the triggering event is active; and
sampling the sensor data stream according to the second sampling interval when it is determined that the modification period has not elapsed and the triggering event is active.

2. The method of claim 1, further comprising reverting the sampling of the sensor data stream according to the first sampling interval when it is determined that the modification period has elapsed or the triggering event is no longer active.

3. The method of claim 1, wherein the first sampling interval is a default sampling interval.

4. The method of claim 1, wherein the sensor fidelity rule is statically defined.

5. The method of claim 1, wherein the sensor fidelity rule is changed based on information obtained from an external data source.

6. The method of claim 1, wherein the sensor data stream is associated with a plurality of sensor fidelity rules.

7. The method of claim 1, wherein the sensor fidelity rule is associated with a plurality of sensor data streams.

8. A system comprising:
a processor; and
a memory in communication with the processor, the memory storing program instructions, the processor operative with the program instructions to perform operations of:
receiving a sensor data stream from a sensor;
determining that the sensor data stream is associated with a sensor fidelity rule specifying a triggering event, a fidelity modification, and a modification period, wherein the triggering event is a change in a value that is monitored by the sensor:
sampling the sensor data stream according to a first sampling interval; responsive to occurrence of the triggering event, changing the first sampling interval to a second sampling interval based on the fidelity modification;
determining whether the modification period has elapsed and whether the triggering event is active;
sampling the sensor data stream according to the second sampling interval when it is determined that the modification period has not elapsed and the triggering event is active;
and reverting the sampling of the sensor data stream according to the first sampling interval when it is determined that the modification period has elapsed or the triggering event is no longer active.

9. The system of claim 8, wherein the first sampling interval is a default sampling interval, and the second sampling interval is different from the first sampling interval.

10. The system of claim 8, wherein the sensor fidelity rule is statically defined.

11. The system of claim 8, wherein the sensor fidelity rule is changed based on information obtained from an external data source.

12. The system of claim 8, wherein the sensor data stream is associated with a plurality of sensor fidelity rules.

13. The system of claim 8, wherein the sensor fidelity rule is associated with a plurality of sensor data streams.

14. The system of claim 8, wherein the sensor data stream is sampled at different sampling intervals by different receiving endpoints.

15. A non-transitory computer readable medium not including a transitory signal having stored therein instructions that when executed cause a computer to perform a method comprising:
receiving a sensor data stream from a sensor;
determining that the sensor data stream is associated with a sensor fidelity rule specifying a triggering event, a fidelity modification, and a modification period, wherein the triggering event is a change in a value that is monitored by the sensor;
sampling the sensor data stream according to a first sampling interval;
responsive to occurrence of the triggering event, changing the first sampling interval to a second sampling interval based on the fidelity modification, wherein the second sampling interval is different from the first sampling interval;
determining whether the modification period has elapsed and whether the triggering event is active;
sampling the sensor data stream according to the second sampling interval when it is determined that the modification period has not elapsed and the triggering event is active; and
reverting the sampling of the sensor data stream according to the first sampling interval when it is determined that the modification period has elapsed or the triggering event is no longer active.

16. The non-transitory computer-readable medium of claim 15, wherein the first sampling interval is a default sampling interval.

17. The non-transitory computer-readable medium of claim 15, wherein the sensor fidelity rule is statically defined.

18. The non-transitory computer-readable medium of claim 15, wherein the sensor fidelity rule is changed based on information obtained from an external data source.

19. The non-transitory computer-readable medium of claim 15, wherein the sensor data stream is associated with a plurality of sensor fidelity rules.

20. The non-transitory computer-readable medium of claim 15, wherein the sensor fidelity rule is associated with a plurality of sensor data streams.

* * * * *